(12) United States Patent
Wu et al.

(10) Patent No.: US 12,147,475 B2
(45) Date of Patent: Nov. 19, 2024

(54) METHOD AND SYSTEM FOR STORING DATA IN GRAPH DATABASE

(71) Applicant: VESOFT Company Limited, Kent, DE (US)

(72) Inventors: Min Wu, Hangzhou (CN); Siwei Gu, Hangzhou (CN); Tong Yue, Hangzhou (CN); Yixuan Yang, Hangzhou (CN); Fengxian Huang, Hangzhou (CN); Zhenya Liang, Hangzhou (CN); Yao Zhou, Hangzhou (CN); Xiaomeng Ye, Hangzhou (CN)

(73) Assignee: VESOFT Company Limited, Dover, DE (US)

( * ) Notice: Subject to any disclaimer, the term of this patent is extended or adjusted under 35 U.S.C. 154(b) by 152 days.

(21) Appl. No.: 17/977,226

(22) Filed: Oct. 31, 2022

(65) Prior Publication Data

US 2023/0140423 A1 May 4, 2023

(30) Foreign Application Priority Data

Nov. 1, 2021 (CN) .......................... 202111291714.9
Jun. 9, 2022 (CN) .......................... 202210647635.5

(51) Int. Cl.
*G06F 16/00* (2019.01)
*G06F 16/901* (2019.01)
*G06F 16/903* (2019.01)

(52) U.S. Cl.
CPC .... *G06F 16/9024* (2019.01); *G06F 16/90335* (2019.01)

(58) Field of Classification Search
CPC ...................... G06F 16/9024; G06F 16/90335
(Continued)

(56) References Cited

U.S. PATENT DOCUMENTS

| 10,346,138 B1 * | 7/2019 | Quillen | G06F 8/315 |
| 2014/0259005 A1 * | 9/2014 | Jeffrey | G06F 8/65 |
| | | | 717/173 |

(Continued)

FOREIGN PATENT DOCUMENTS

| CN | 109446362 A | * | 3/2019 | |
| CN | 110399089 A | * | 11/2019 | G06F 3/0604 |

(Continued)

OTHER PUBLICATIONS

Zhu Xiaowei et al., "LiveGraph: A transactional Graph Storage System with Purely Sequential Adjacency List Scans", arXiv:1910.05773v2 [cs. DB] Aug. 29, 2020, 20 pages.*

*Primary Examiner* — Monica M Pyo
(74) *Attorney, Agent, or Firm* — Ziegler IP Law Group LLC.

(57) ABSTRACT

The present application relates to a method and system for storing data in a graph database. The method includes: separating a key-value structure of the storage engine and separately storing a graph structure and a graph property of graph data; and reading, by the compute engine, the graph structure, caching the graph structure for a short term in a single query request scenario, and caching the graph structure for a long term in a read-only analysis scenario. The present application resolves problems that engineering is complex and deep graph traversal performance is poor when graph data is processed, reduces engineering complexity, and improves the deep graph traversal performance.

13 Claims, 4 Drawing Sheets

(58) Field of Classification Search
USPC .......................................................... 707/741
See application file for complete search history.

(56) References Cited

U.S. PATENT DOCUMENTS

2019/0325075 A1* 10/2019 Hilloulin ............. G06F 16/9024
2021/0142192 A1* 5/2021 Wang ..................... G06N 7/01
2021/0255949 A1* 8/2021 Guda ................. G06F 12/0292

FOREIGN PATENT DOCUMENTS

CN 112166425 A * 1/2021 ......... G06F 16/2237
CN 112256927 A * 1/2021

* cited by examiner

When a first property of a first graph element of a graph database is composite data, create N+1 self-loop attached edges on the first graph element, where N is greater than a quantity of elements of the composite data Match the attached edges on the first graph element with the elements of the composite data one-to-one, where a rank value of the attached edge is a ranking value of the corresponding element in the composite data, and a property includes a real value of the corresponding element

FIG. 4

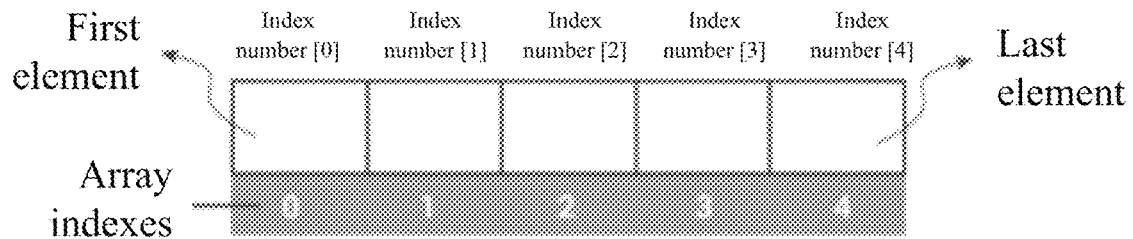

FIG. 5

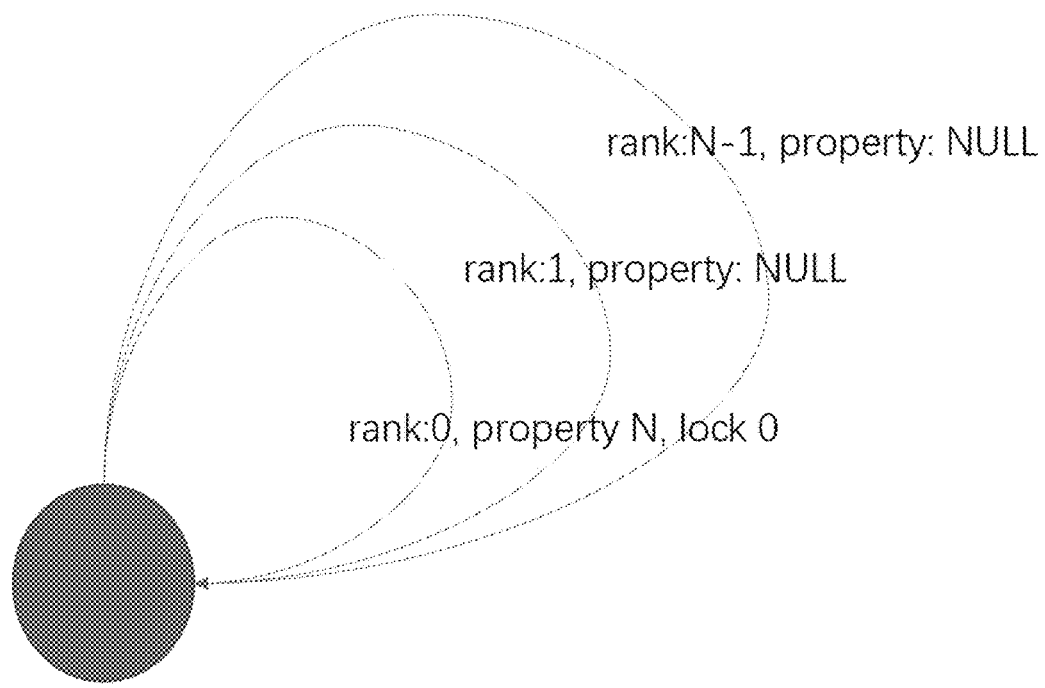

FIG. 6

METHOD AND SYSTEM FOR STORING DATA IN GRAPH DATABASE

CROSS REFERENCE TO RELATED APPLICATIONS

This patent application claims the benefit and priority of Chinese Patent Application No. 2022106476355 filed on Jun. 9, 2022, and Chinese Patent Application No. 2021112917149 filed on Nov. 1, 2021, the disclosure of which is incorporated by reference herein in their entireties as part of the present application.

TECHNICAL FIELD

The present application relates to the field of graph databases, and in particular, to a method and system for storing data in a graph database.

BACKGROUND

As a database used to process a graph data structure, a graph database can complete graph traversal in milliseconds. The graph data structure consists of a vertex and an edge. A property of the vertex and a property of the edge constitute graph properties. For example, in such an equity relationship as (company)←[investment]-(shareholder), the company and shareholder are vertices, and [investment] is an edge. The edge [investment] has a property "investment amount". To query all shareholders of the company, only the graph structure needs to be used, and the graph properties do not need to be used. To query the largest shareholder of the company, both the graph structure and graph properties need to be used. Therefore, a quantity of access times of the graph structure is more than that of the graph properties, and acceleration for the graph structure is more important than that for the graph properties.

In the related art, there are generally two design ideas for a graph structure and a graph property of graph data: A native graph of Neo4j is used as an example for one of the design idea. A completely user-defined graph structure and graph property are used, and a compute engine and a storage engine are in a same process. The graph structure uses a doubly linked list, and the graph property uses a singly linked list. When a first adjacent edge of a vertex is read, a speed is extremely high, but engineering complexity is high.

JanusGraph and Nebula Graph are used as examples for the other design idea. A compute engine and a storage engine are not in a same process. The storage engine uses a key-value structure to store a graph structure and a graph property. This design idea can reduce engineering complexity and is suitable for construction of large-scale distributed systems. However, performance is poor during deep traversal. This separate architecture does not perform hierarchical caching and acceleration for graph data, and data must be frequently exchanged between the two engines. For example, the storage engine accesses unoptimized graph topology data, and the compute engine reads uncached graph topology data. Consequently, deep traversal performance of an existing separate structure is poor.

At present, no effective solution has been proposed for problems in the related art that engineering is complex and deep graph traversal performance is poor when graph data is processed.

SUMMARY

Embodiments of the present application provide a method and system for storing data in a graph database to at least resolve problems in the related art that engineering is complex and deep graph traversal performance is poor when graph data is processed.

According to a first aspect, the embodiments of the present application provide a method for storing data in a graph database, applied to a system for separating a graph structure and a graph property in a graph database. The system includes a storage engine and a compute engine. The method includes:

separating a key-value structure of the storage engine and separately storing a graph structure and a graph property of graph data; and reading, by the compute engine, the graph structure, caching the graph structure for a short term in a single query request scenario, and caching the graph structure for a long term in a read-only analysis scenario.

In some embodiments, the separating a key-value structure of the storage engine includes:

adding four paired read interfaces in the storage engine to obtain data stored in a key part of the key-value structure.

In some embodiments, the caching the graph structure for a short term includes:

determining a required part of the graph structure through an execution plan from a first clause of a query statement, and checking whether the required part of the graph structure is cached in an adjacency list of a current process;

if no, requesting and obtaining an edge from the storage engine, and adding a corresponding linked list to the adjacency list; or if yes, obtaining the required part of the graph structure from the adjacency list; and executing the query statement and releasing cached data of the adjacency list.

In some embodiments, the requesting and obtaining an edge from the storage engine includes:

actively making, by the compute engine, a remote procedure call (RPC) request to the storage engine, or returning the edge through pre-read loading of the storage engine.

In some embodiments, the caching the graph structure for a long term includes:

caching the graph structure through a compressed sparse row (CSR).

In some embodiments, the caching the graph structure through a CSR includes:

collecting statistics on and aggregating data of each partition of the graph structure in the storage engine, performing vertex encoding and edge encoding on the data, and storing the data in the storage engine; and scanning all mapping relationships and all edges in the key-value part of each partition, processing a corresponding concurrent task and subtask, generating the CSR, and caching the CSR in the compute engine.

In some embodiments, after the generating the CSR and caching the CSR in the compute engine, the method includes:

deleting a graph topology cached in the compute engine and a persistent mapping encoded in the storage engine through a delete instruction.

In some embodiments, the method further includes:

when a first property of a first graph element of the graph database is composite data, creating N+1 self-loop attached edges on the first graph element, where N is greater than a quantity of elements of the composite data, and the first graph element is the graph property according to claim 1; and matching the attached edges on the first graph element with the elements of the composite data one-to-one, where a rank value of the attached edge is a ranking value of the corresponding element in the composite data, and a property includes a real value of the corresponding element.

In some embodiments, a visibility permission on the attached edge is set.

In some embodiments, the attached edges include a first edge, and a property of the first edge includes a concurrency control value, and the method further includes:
when a client wants to operate the attached edge on the first graph element, determining whether the concurrency control value is a controllable value, and if yes, allowing the client to operate the attached edge, and changing the controllable value to a unique identifier of the client, or if no, forbidding the client to operate the attached edge.

In some embodiments, when the client wants to operate the attached edge on the first graph element, the attached edge to be operated and the first edge are concurrently read.

In some embodiments, the method further includes:
determining in real time whether the unique identifier of the client exists and whether the client is online, and if one of the conditions is not met, changing the concurrency control value from the unique identifier of the client to the controllable value.

In some embodiments, the property of the first edge further includes a composite length, the composite length is the quantity of elements of the composite data, and the method further includes:
when the first graph element needs to be expanded to a length of M and the concurrency control value is changed to the unique identifier of the client, sequentially creating $(N+2)^{th}$ to $M^{th}$ attached edges, and changing the composite length to M, where M is greater than N.

In some embodiments, first creation and subsequent expansion each are a creation event, and the method further includes:
before each creation event is completed, displaying and operating only data before the current creation event; and
if at least one attached edge fails to be created in a creation event and a retry fails, performing garbage collection on an attached edge successfully created in the creation event.

In some embodiments, when the composite data is of a linked list type, the property of the attached edge further includes a rank value of an attached edge corresponding to a next element.

In some embodiments, when the composite data is of a set type, the rank value of the attached edge is a hash value of a real value of a corresponding element, and the property of the attached edge further includes a rank value of an attached edge corresponding to a next element.

According to a second aspect, the embodiments of the present application provide a system for storing data in a graph database. The system includes a storage engine and a compute engine;
the storage engine separates a key-value structure and separately stores a graph structure and a graph property of graph data; and
the compute engine reads the graph structure, caches the graph structure for a short term in a single query request scenario, and caches the graph structure for a long term in a read-only analysis scenario.

In some embodiments, that the compute engine caches the graph structure for the short term includes:
the compute engine determines a required part of the graph structure through an execution plan from a first clause of a query statement, and checks whether the required part of the graph structure is cached in an adjacency list of a current process;
if no, the compute engine requests and obtains an edge from the storage engine, and adds a corresponding linked list to the adjacency list; or if yes, the compute engine obtains the required part of the graph structure from the adjacency list; and the compute engine executes the query statement and release cached data of the adjacency list.

In some embodiments, that the compute engine caches the graph structure for the long term includes:
the compute engine caches the graph structure through a compressed sparse row (CSR).

In some embodiments, that the storage engine separates a key-value structure includes:
the storage engine obtains data stored in a key part of the key-value structure by adding four paired read interfaces.

Compared with the related art, the embodiments of the present application provide the method for storing data in a graph database, applied to the system for separating a graph structure and a graph property in a graph database. The system includes a storage engine and a compute engine. Specifically, the key-value structure of the storage engine is separated and the graph structure and the graph property of the graph data are separately stored. The compute engine reads the graph structure, caches the graph structure for a short term in a single query request scenario, and caches the graph structure for a long term in a read-only analysis scenario.

In the storage engine of the present application, the key-value separation solution is used to separate the graph structure and the graph property in hardware. This improves a speed of reading the graph structure in a hard disk and memory. In addition, the compute engine caches the graph structure for the long term and short term. Beneficial effects are as follows: 1. A latency of a graph query and graph computing is reduced. 2. There is much reusable engineering code, a development amount is small, and a development risk is low. 3. Compatibility is good, and historical query statements and files can be compatible without modifications by a user.

BRIEF DESCRIPTION OF DRAWINGS

The accompanying drawings described here are provided for further understanding of the present application, and constitute a part of the present application. The exemplary embodiments of the present application and illustrations thereof are intended to explain the present application, but do not constitute inappropriate limitations to the present application. In the accompanying drawings:

FIG. 4 is a schematic flowchart of a method for supporting composite data types by graph properties according to an embodiment of the present application;

FIG. 5 is a schematic structural diagram of an array according to an embodiment of the present application;

FIG. 6 is a diagram of an implementation in which a vertex property supports an array according to an embodiment of the present application;

DETAILED DESCRIPTION

Figure 1:
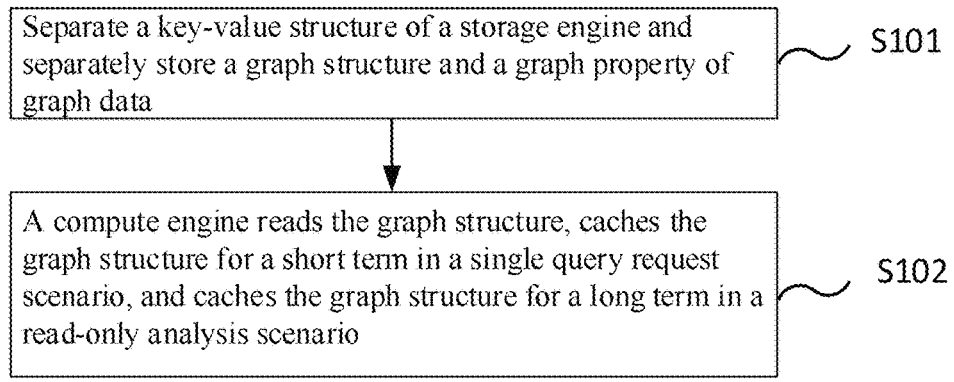
FIG. 1 is a flowchart of a method for separating a graph structure and a graph property according to an embodiment of the present application.

To make the objectives, technical solutions, and advantages of the present application clearer, the present application is described below with reference to the accompanying drawings and embodiments. It should be understood that the embodiments described herein are merely used to explain the present application, rather than to limit the present application. All other embodiments obtained by those of ordinary skill in the art based on the embodiments of the present application without creative efforts should fall within the protection scope of the present application. In addition, it can also be appreciated that, although it may take enduring and complex efforts to achieve such a development process, for those of ordinary skill in the art related to the present application, some changes such as design, manufacturing or production made based on the technical content in the present application are merely regular technical means, and should not be construed as insufficiency of the present application.

The "embodiment" mentioned in the present application means that a specific feature, structure, or characteristic described in combination with the embodiment may be included in at least one embodiment of the present application. The phrase appearing in different parts of the specification does not necessarily refer to the same embodiment or an independent or alternative embodiment exclusive of other embodiments. It may be explicitly or implicitly appreciated by those of ordinary skill in the art that the embodiment described herein may be combined with other embodiments as long as no conflict occurs.

Unless otherwise defined, the technical or scientific terms used in the present application are as they are usually understood by those of ordinary skill in the art to which the present application pertains. The terms "one", "a", "the", and similar words are not meant to be limiting, and may represent a singular form or a plural form. The terms "include", "contain", "have", and any other variants in the present application mean to cover the non-exclusive inclusion, for example, a process, method, system, product, or device that includes a series of steps or modules (units) is not necessarily limited to those steps or units which are clearly listed, but may include other steps or units which are not expressly listed or inherent to such a process, method, system, product, or device. "Connected", "interconnected", "coupled", and similar words in the present application are not restricted to physical or mechanical connections, but may include electrical connections, whether direct or indirect. The term "plurality of" in the present application means two or more. The term "and/or" describes associations between associated objects, and it indicates three types of relationships. For example, "A and/or B" may indicate that A exists alone, A and B coexist, or B exists alone. The terms "first", "second", "third", and so on in the present application are intended to distinguish between similar objects but do not necessarily indicate a specific order of the objects.

Embodiment 1

Figure 2:
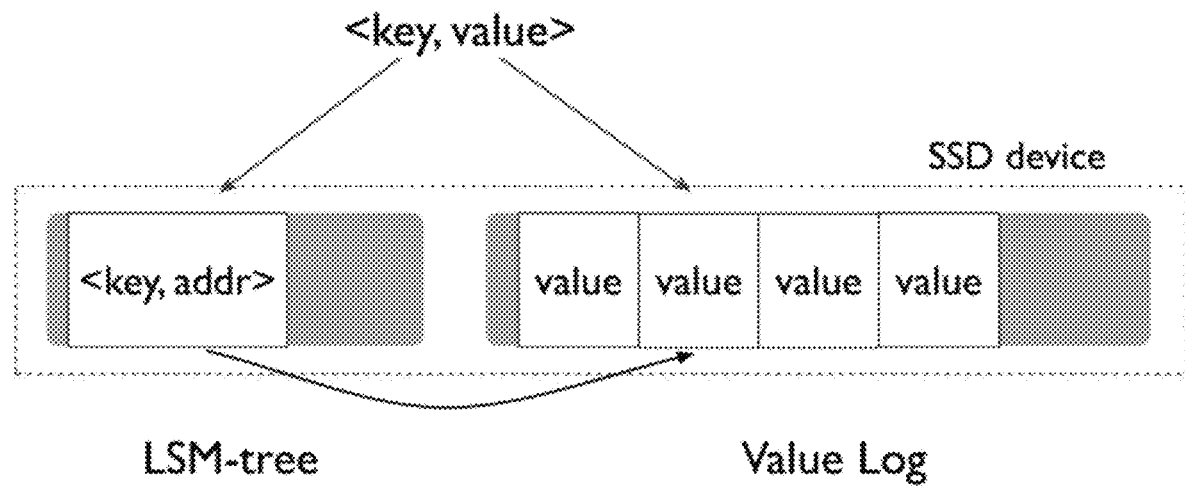
FIG. 2 is a schematic diagram of a key-value separated structure according to an embodiment of the present application.

An embodiment of the present application provides a method for storing data in a graph database. FIG. 1 is a flowchart of a method for separating a graph structure and a graph property according to an embodiment of the present application. As shown in FIG. 1, the method includes the following steps:

S101: Separate a key-value structure of a storage engine and separately store a graph structure and a graph property of graph data. Specific separation design of the storage engine is as follows:

FIG. 2 is a schematic diagram of a key-value separated structure according to an embodiment of the present application. As shown in FIG. 2, a key-value separation solution is used in this embodiment. All keys are aggregated into a smaller log-structured merge-tree (LSM-tree), and all values are aggregated into a value log file in an append-only manner. An addr part of each <key, addr> in the LSM-tree points to an offset and a length in the value log file. It should be noted that both a read interface and a write interface are partially adjusted: A form of the write interface is unchanged, but storage is split into the LSM-tree and the value log file. A form of the read interface is also unchanged, but a reading process is divided into the following steps: First, read the LSM-tree on the left to obtain <key, addr> and obtain an addr value of data to be read; then, obtain a corresponding offset and length in the value log file based on the addr value and take out a real value; and finally, splicing the real value and the read key value to obtain and return <key, value>.

Further, in the separation design of this embodiment, a compact( ) interface is customized. When garbage data reaches a specified proportion, for example, 30%, compact( ) for full data is triggered. Otherwise, only compact( ) for the LSM-tree is triggered by default. In this way, read/write amplification of a hard disk caused by compact( ) can be greatly reduced.

After the key-value separation, a block cache is changed to allow only data of the key part to be cached. To migrate an inventory historical data file, inventory <key, value> data may be read one by one through a batch task or a customized compact task and changed to the LSM-tree+Value log format.

In addition, in this embodiment, four paired read interfaces are added to the storage engine to obtain data stored in the key part of the key-value structure. Specifically, the four paired interfaces are GetKey( ), MultiGetKey( ), RangeKey( ), and PrefixKey( ). The four new interfaces are used to obtain only the data stored in the key part, but not data stored in a value part. This means that the four new interfaces need to access only the LSM-tree on the left in FIG. 2, but not the value log file on the right. Corresponding, the hard disk accesses only a hard disk file in the LSM-tree part, but does not access a hard disk file in the value log part. Amount of data loaded into a memory from the hard disk is greatly reduced. In addition, because a data memory occupied by the key part is much smaller than that occupied by the value part, a latency is greatly reduced.

In the storage engine of this embodiment, the key-value separation solution is used to separate the graph structure and the graph property in hardware. This effectively improves a speed of reading the graph structure in the hard disk and memory.

S102: A compute engine reads the graph structure, caches the graph structure for a short term in a single query request scenario, and caches the graph structure for a long term in a read-only analysis scenario. It should be noted that a cache of the graph structure at a single query level means that in a compound statement composed of a plurality of clauses or a single query statement, the graph structure obtained by a previous clause can be reused by a subsequent clause until the cache is released after the query of the compound statement is completed. The cache of the graph structure is not reused between different query statements. In the read-only analysis scenario, an administrator specifies to generate a graph cache through a command. The graph cache can be used by various query statements until the administrator specifies to delete the graph cache. In specific practice, short-term caching and long-term caching may be combined. For example, a validity period for short-term caching may be changed to be controlled or configured by the administrator. A cache life cycle for long-term caching may be specified by some specific query statements.

Preferably, in this embodiment, in the single query request scenario, the graph structure is cached through an adjacency list. A specific process is as follows:

S1: Determine a required part of the graph structure through an execution plan from a first clause of a query statement.

S2: Check whether the required part of the graph structure is cached in an adjacency list of a current process.

If no, request and obtain an edge from the storage engine, and add a corresponding linked list to the adjacency list each time one or more edges are requested from the storage engine. Preferably, the requesting and obtaining herein may be that the compute engine actively makes an RPC request to the storage engine, or that the edge is returned through pre-read loading of the storage engine. For example, the compute engine requests only an edge 0→1, but the storage engine returns the edge 0→1 and other adjacent edges of a vertex 0, such as 0→4 and 1→0, due to storage locality.

If yes, the compute engine directly obtains the required part of the graph structure from the adjacency list.

S3: Execute the query statement and release cached data of the adjacency list.

Through the foregoing steps, when the graph structure is cached, an adjacency list supporting concurrency, such as Concurrent HashMap, may be used to improve a multithread concurrency capability. The compute engine does not need to obtain the entire graph structure such that memory can be effectively saved.

For example, 5 subquery statements subquery1, subquery2, subquery3, subquery4, and subquery5 are sequentially executed. subquery1 is executed to perform 6-hops breadth-first expansion from a vertex "fludamreyhkyxgvqdssf". After the expansion, a first hop can be understood as an adjacent vertex of this vertex, a second hop can be understood as an adjacent vertex of the adjacent vertex of this vertex, and so on. The 6-hops breadth-first expansion is performed to obtain 6-hops adjacent vertices. Then, all adjacent vertices are obtained and subquery3 is executed to obtain paths among the adjacent vertices. Finally, subquery5 is executed to count how many paths among all paths of the vertex "fludamreyhkyxgvqdssf" can be used to connect to the vertex "fludamreyhkyxgvqdssf". For example, how many friend chains can be used by a person to connect to a friend far away is counted. Specific code is as follows:

go 6 steps from "fludamreyhkyxgvqdssf" over*YIELD RM10011889._dst as dst//Execute subquery1 to obtain the adjacent vertices of the vertex "fludamreyhkyxgvqdssf".

|//Execute subquery2 to pass a result of subquery1 to subquery3.

find all path from "fludamreyhkyxgvqdssf" to $-.dst over*UPTO 6 steps

//Execute subquery3 to find all paths related to the vertex "fludamreyhkyxgvqdssf".

|//Execute subquery4 to pass a result of subquery3 to subquery5.

YIELD count(*)//Execute subquery5 to count how many paths among all paths of the vertex "fludamreyhkyxgvqdssf" can be used to connect to the vertex "fludamreyhkyxgvqdssf".

In some typical large-scale scenarios, before the graph structure is cached, the 6-layer breadth-first search (BFS) involves approximately 370,000 concurrent RPC requests, approximately 3 million paths are generated in total, and an amount of data is huge. Caching only the graph structure in the compute engine can effectively reduce an RPC communication latency by half and improve efficiency.

Preferably, in this embodiment, in the read-only analysis scenario, the graph structure is cached through a CSR. A specific process is as follows:

S1: Collect statistics on and aggregate data of each partition of the graph structure in the storage engine, perform vertex encoding and edge encoding on the data, and store the data in the storage engine.

S2: Scan all mapping relationships and all edges in each partition, process a corresponding concurrent task and subtask, generate the CSR, and cache the CSR in the compute engine.

In some embodiments, after the CSR is generated and cached in the compute engine, a graph topology cached in the compute engine and a persistent mapping encoded in the storage engine are deleted by sending a delete instruction.

It should be noted that the graph structure and the graph property are separated through the key-value separation in S101 such that the encoding process of the CSR in this embodiment can be greatly accelerated.

Figure 3:
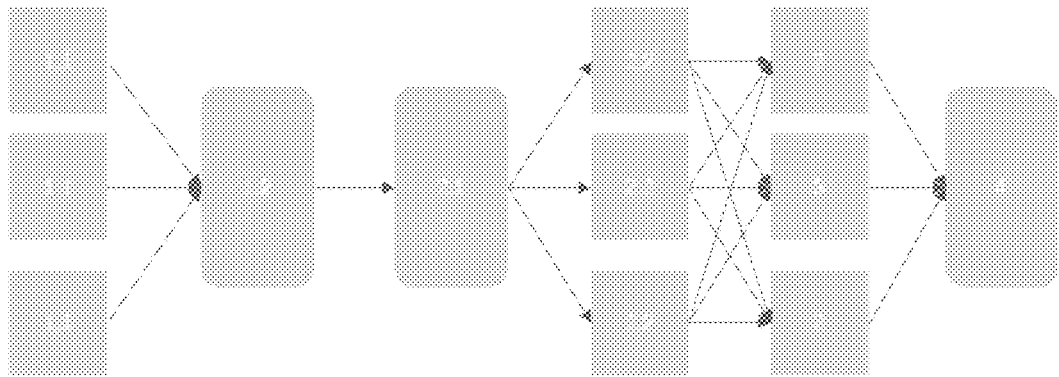
FIG. 3 is a schematic diagram of a task flow for caching a graph structure through a CSR according to an embodiment of the present application.

Specifically, an example in which an ID card number VID of a student is encoded into a student number int32 ID of the student is used in this embodiment. FIG. 3 is a schematic diagram of a task flow for caching a graph structure through a CSR according to an embodiment of the present application. As shown in FIG. 3, a specific process is as follows:

S1: Run a statistics collection task 1 in Nebula Graph. The statistics collection task 1 includes a concurrent subtask 1.1 and an aggregation subtask 1.2.

The concurrent subtask 1.1 is used to count a quantity of VIDs in each partition of the storage engine, which is denoted as P1, P2, . . . , and PN. A quantity of concurrent subtasks is equal to the quantity of partitions. It should be noted that this process corresponds to one scan of the LSM-tree in each partition.

The aggregation subtask 1.2 is used to aggregate a total quantity of VIDs in the storage engine. It should be noted that the aggregation subtask 1.2 needs to be executed through only a single process.

In specific implementation, a large amount of existing submit job stats function code in Nebula Graph can be reused in the concurrent subtask 1.1.

S2: Run an encoding task 2 in Nebula Graph to perform vertex encoding. The encoding task 2 includes an aggregation subtask 2.1 and a concurrent subtask 2.2.

The aggregation subtask 2.1 is used to allocate a continuous ID range [begin, end] to each partition. For example, a continuous ID range [1, P1] is allocated to a partition 1, [P1+1, P1+P2] is allocated to a partition 2, [P1+P2+1, P1+P2+P3] is allocated to a partition 3, and so on.

The concurrent subtask 2.2 is used to scan and record VID1 as two <key, value> pairs, namely, <begin, VID1> and <VID1, begin> for each partition, and write the two <key, value> pairs to the storage engine of Nebula Graph, where begin is allocated in the aggregation subtask 2.1; and then scan VID2 to generate <begin+1, VID2> and <VID2, begin+1>, which are sequentially incremented in a same way as the foregoing process.

S3: Run an encoding task 3 in Nebula Graph to perform edge encoding. Specifically, when the concurrent task 3 is run, an edge originally represented by (VID1)→(VID2) is changed to (int32 ID1)→(int32 ID2) in each partition. For example, an original edge ("abc001")→("bcd002") may be expressed as (1)→(12). In this embodiment, before edge encoding, the storage engine of Nebula Graph needs to use 58 bytes to store one edge, and after edge encoding, only 8 bytes are needed. The memory occupied during subsequent computing is greatly reduced.

S4: Run a generation task 4 to generate the CSR.

A concurrent subtask 4.1 is used to scan all mapping relationships in each partition, that is, mapping relationships between the VIDs and int32 IDs generated in the concurrent subtask 2.2, and all edges, obtain a quantity of edges in each partition, and synchronize the quantity of edges to other concurrent tasks.

Each concurrent subtask 4.2 is used to compute a corresponding row in the CSR format in the memory by using open source code "C++ boost library" compressed_sparse_row_graph class.

A concurrent subtask 4.3 aggregates results computed by using the concurrent subtask 4.2 to a specific process to form a complete CSR.

S5: Cache the CSR corresponding to the encoded int32 ID in the compute engine.

S6: Send an instruction to enable the compute engine to delete the cached graph topology and enable the storage engine to delete the encoded persistent mapping.

In this embodiment, the compute engine caches the graph structure for the long term and short term. This reduces a latency of a graph query and graph computing. In addition, there is much reusable engineering code, a development amount is small, and a development risk is low. Furthermore, compatibility is good, and historical query statements and files can be compatible without modifications by a user.

Through S101 and S102, in the storage engine in this embodiment, the key-value separation solution is used to separate the graph structure and the graph property in the hardware. This improves the speed of reading the graph structure in the hard disk and memory, accelerates access to the graph structure, and is of great help to the subsequent computing. In addition, the development amount and development risk are reduced, and historical compatibility of data files is maintained. The compute engine caches the graph structure for the long term and short term. This further reduces the latency of the graph query and graph computing, and compatibility of historical queries is maintained. The combination of the two solutions resolves problems that engineering is complex and deep graph traversal performance is poor when graph data is processed, reduces engineering complexity, and improves the deep graph traversal performance.

Embodiment 2

An embodiment of the present application provides a method for storing data in a graph database to enable the graph property stored separately from the graph structure in Embodiment 1 to support composite data types. It should be noted that a "first graph element" in this embodiment of the present application is the "graph property" in Embodiment 1.

It should be noted that a graph database is a kind of database system designed to store and query a property graph in real time. Nebula Graph is used as an example. In a graph database in Nebula Graph, there are several core elements constituting a property graph: vertex and edge. A vertex is uniquely identified and may or may not have a property. An edge is a relationship between two vertices, has a direction, and is composed of a type and a property. A quadruple <start vertex, edge type, rank, end vertex> is used to uniquely identify an edge.

When the start vertex, end vertex, and edge type are the same, rank can be well used for distinguishing. For example, in a transfer network, there is a start vertex A and an end vertex B, an edge type is transfer, and a transfer serial number may be placed in the rank field such that each transfer can be uniquely identified. In a graph query language, @123 is used to operate on edges with a rank value of 123. A value range of rank is 0 to INT_MAX (a maximum int value). In TigerGraph, there is no concept of rank, but it can be replaced by various edge types.

A specific example is illustrated as follows:

A bank account is a vertex, an identifier is a card number, and properties are an account opening time (whose data type is timestamp), an account name (whose data type is string), and a balance (whose data type is double). Transfer between two bank accounts is an edge, and properties are a transfer amount (whose data type is double) and a transfer postscript (whose data type is string). The data types of the foregoing properties are all basic data types. For example, names of previous account managers are stored, such as ['alice', 'bob', 'kite'], which is a linked list or of the array data type, namely, a composite data type.

In most existing graph database systems, basic data types (int, string, float, double, and the like) are well supported for properties. However, whether composite data types are supported is varies with products. For example, schema-less products such as Neo4j, with flexibility as a main goal, can support various composite data types, but correspondingly sacrifice performance. Strong schema products such as TigerGraph and Nebula Graph do not support composite data types by default in consideration of performance.

However, composite data structures such as array, list, set, and map are common in mainstream programming languages such as Java. "Composite" refers to a more complex structure such as List<int>, which is composed of basic types (such as 8-byte int) based on data structures such as a linked list, queue, set, or map. For example, an array can be quickly indexed by subscript, and time complexity is $O(1)$, but if a cost of inserting an element into the array is very high, time complexity is $O(n)$. A new element can be quickly inserted or deleted from a linked list, but an addressing time is $O(n)$. Duplicate elements cannot appear in a set.

Due to a common role of composite data types in programming, how to support composite data types in graph databases without sacrificing performance is an urgent problem to be resolved in the industry.

Specifically, in some embodiments of the present application, a vertex property in a graph database is enabled to support the composite data type array. Before this embodiment is described, an array in this embodiment is illustrated as follows:

FIG. 5 shows a structure of an array. A length of the array is 5. Indexes of the array start from 0 to 4. Index numbers are used to access elements of the array. For example, an index number [0] is used to access a first element of the array, an index number [1] is used to access a second element, and so on.

In this embodiment, operation definitions of the array are described as follows:
1. Initialization: Each data stored in the array is also referred to as an element. A type of the element is determined when the data is created. A function create_array<int>(N) is defined to initialize an array with a length N and an element type int.
2. Length operation: Once the length N of the array is determined, it cannot be changed. A function length( ) is defined to obtain the length of an array.
3. Expansion: The array can be expanded. A function resize(M) is defined to expand an array to a length of M, where M>N. In general, array shrinking is not allowed.
4. Subscript fetching elements: Each element has an exact position in the array and can be accessed based on its subscript. Functions get(i) and set(i) are defined to respectively read and write a value of a subscript i. delete(i) used to delete a specific element is generally not supported in arrays because of its high cost.
5. Destruction: A function destroy_array( ) is defined to delete the array.
6. Garbage collection: Partial failure, logical deletion, or the like causes remaining space not to be immediately reclaimed, which can be reclaimed through a garbage collection function trim( ) to prevent space waste. In Java, garbage collection is also referred to as GC.

Interfaces of array operations in Object Graph Mapping (OGM) are defined through the foregoing operations such that a user of OGM can see that a vertex property supports the composite data type array.

OGM is described as follows. It is an abbreviation of Object Graph Mapping and is a concept first proposed by Neo4j. Its function is close to that of a Relational Mapping (ORM) framework of relational databases such as Hibernate and Mybatis. It allows the user to add, delete, modify, and query vertices, edges, paths, and subgraphs in a graph database by operating (classes) objects in programming languages. Specific database operation statements (such as Cypher of Neo4j) are implemented by the OGM framework. In this way, the user only needs to use familiar Python or Java without learning a database operation language. In addition, the programming language (Python or Java) is Turing-complete and more flexible than languages such as Cypher.

Compare And Swap (CAS) is described as follows: CAS is a kind of atomic operation and can be used to implement uninterrupted data exchange in concurrent programming to avoid data inconsistency caused by uncertainty of an execution sequence and unpredictability of interruption when concurrent operations simultaneously overwrite specific data. This operation compares specified data and replaces the compared data with a new value when values are the same.

As shown in FIG. 4, this embodiment discloses a method for supporting composite data types in a graph database, including:

S1: When a first property of a first graph element of a graph database is composite data, create N+1 self-loop attached edges on the first graph element, where N is greater than a quantity of elements of the composite data.

As shown in FIG. 6, when the first property is a vertex, the composite data is an array, and a quantity of elements of the array is N, N+1 self-loop attached edges are created for the vertex.

S2: Match the attached edges on the first graph element with the elements of the composite data one-to-one. A rank value of the attached edge is a ranking value of the corresponding element in the composite data, and a property includes a real value of the corresponding element.

In this embodiment, the attached edges include a first edge and other edges. Properties of the first edge include a concurrency control value and a composite length, corresponding to rank 0 in FIG. 6. The property field specifies the properties, N is the composite length, and lock 0 is a controllable value. The other edges include edges corresponding to rank 1, rank 2, . . . , and rank N and are used to store real values of the corresponding elements.

Operations on vertex properties in this embodiment are implemented as follows:
1. Perform initialization: create_array <int>(N).
   a.//Create N+1 self-loop attached edges aux-edge for the vertex, where rank values are 0 to N, and the property field is of the int data type. A specific name of aux-edge is specified by a user to control a same-name conflict during the creation.
   CREATE EDGE aux-edge (property INT, lock INT)
   b.//For edges corresponding to rank 1, rank 2, . . . , and rank N, the value of the property field is NULL, which means a null pointer, and the value is subsequently supplemented based on a real value.
   UPSERT EDGE aux-edge @1, 2, . . . ,N:(NULL)
   c.//For an edge corresponding to rank 0, the value of the property field is N.
   UPSERT EDGE aux-edge @0:(N,0)

A composite data type involves a plurality of elements, and concurrent operations may cause damage to the composite data type. Therefore, the present application further implements an atomicity, consistency, isolation, and durability (ACID) operation on the composite data type. This function does not depend on an ACID capability of the graph database because Nebula Graph, JanusGraph, and the like do not have the ACID capability but use the CAS capability for a single operation statement provided by the graph database. Implementation of the present application can be simplified if the graph database has the ACID capability. The ACID operation is as follows:

When a client wants to operate the attached edge on the first graph element, determine whether the concurrency control value is a controllable value. If yes, allow the client to operate the attached edge, and change the controllable value to a unique identifier of the client. If no, forbid the client to operate the attached edge.

It can be learned from FIG. 6 that the lock field is used for multi-client concurrency control. A value of 0 indicates that no client performs a write operation. A non-zero value is a session ID, namely, the unique identifier, of the corresponding client, and is used as a lock for multi-client concurrency control.

In this embodiment, the attached edge aux-edge is introduced. To prevent the attached edge from being visible to other users and bring about changes to a graph structure, for example, an increase in a quantity of adjacent edges of a vertex, a visibility permission may be set for aux-edge to make it be visible only to a current user or a special internal user such that external behavior is not damaged.

In this embodiment, first creation and subsequent expansion each are a creation event, and the method further includes:

Before each creation event is completed, display and operate only data before the current creation event.

If at least one attached edge fails to be created in a creation event and a retry fails, perform garbage collection on an attached edge successfully created in the creation event.

Specifically, step b involves the creation of a plurality of self-loop edges, and the creation may fail halfway. In this case, creation of the self-loop edge failed to be created may be retried or abandoned, for example, due to insufficient space. The self-loop edge successfully created becomes garbage and garbage collection may be performed on the self-loop edge in a subsequent trim( ) operation. These are invisible to the external. The whole creation process is completed only when step c is successful, and the array is visible to the external. The statement in step c is a single CAS command and does not partially fail.

In addition, to prevent a session from occupying the lock for a long time due to an unexpected exit of the client, this method further includes:

Determine in real time whether the unique identifier of the client exists and whether the client is online, and if one of the conditions is not met, change the concurrency control value from the unique identifier of the client to the controllable value.

That is, a database backend may check whether the lock and session ID exist in a circular task mode, or check operation logs and perform playback. Recording operation logs is a common means in databases.

2. Obtain a length: length( )
//Obtain the length from the edge corresponding to rank 0. If the value of the lock field is not 0, the operation fails.
FETCH PROP ON aux-edge @0 YIELD lock, property;
3. Perform expansion to a length of M (M>N): resize(M).
The method further includes:

When the first graph element needs to be expanded to a length of M and the concurrency control value is changed to the unique identifier of the client, sequentially create $(N+2)^{th}$ to $M^{th}$ attached edges, and change the composite length to M, where M is greater than N. For example, if N is 10, there are originally N+1, namely, 11 attached edges. When the graph element needs to be expanded to 20, $12^{th}$ to $20^{th}$ attached edges need to be sequentially created.

Specifically:
3.a//Check and lock rank 0 with the session ID of the client. If the WHEN condition is not met, the statement is not executed.
UPDATE EDGE ON aux-edge @0;
SET lock={sessionid} WHEN (lock=0 or lock={sessionid})AND(M>N)
3.b//Create edges corresponding to rank N+1, . . . , and rank M, where the value of the property field is NULL.
UPSERT EDGE aux-edge @ N+1, . . . ,M:(NULL)
3.c//Perform unlocking and change the length to M.
UPDATE EDGE ON aux-edge @0;
SET lock=0 AND property=M WHEN lock={sessionid}
To ensure ACID, the following is further included:
Addition, deletion, and modification on attached edges are all single CAS operation commands.
The UPDATE and UPSERT statements are CAS operations.
In step 3.a, CAS ensures serial execution of a plurality of clients, and the WHEN condition must be met.
In step 3.b, if partial failure occurs and a retry fails, garbage collection is performed on successful data through the trim( ) function. Externally visible length( ) is still N, and [1,2, N] still can be operated. Garbage collection is performed on N+1 to M through trim( ) This ensures that a normal frontend operation of the user can be quickly returned.
In step 3.c, the operation is also atomic.
4. Read and write based on subscripts.
4.a get(i): Read a value of the array subscript i.
//Obtain the values of the lock and property field of rank 0 and rank i at the same time.
//If the value of the lock field is not the session ID or 0, the operation fails.
FETCH PROP ON aux-edge @0, {i} YIELD lock,property;
In this embodiment, when the client wants to operate the attached edge on the first graph element, the attached edge to be operated and the first edge are concurrently read.
Specifically, to ensure high reading performance, this operation chooses not to perform locking in advance, but to directly read rank 0 and rank i by using a concurrent reading capability of the graph database because a marginal cost of reading 1 edge is the same as that of reading 2 edges, and then checks whether rank 0 is locked.
FETCH PROP batch reads of edges with the same vertex are atomic. Impact on other concurrent writes is avoided.
The operation is similar for obtaining an interval [i,j] of an array.
4.b set(i): Change the value of the array subscript i to a new value {newvalue}.
//Perform locking.
UPDATE EDGE ON aux-edge @0;
SET lock={sessionid} WHEN (lock=0 OR lock={sessionid})
//Change the value of rank i, and use {newvalue} as an input parameter.
UPDATE EDGE ON aux-edge @{i};
SET {newvalue}
//Perform unlocking.
UPDATE EDGE ON aux-edge @0;
SET lock=0 WHEN lock={sessionid}
A principle is similar to get(i).
5. Perform destruction: destory_array<int>( ).
//Perform locking.
UPDATE EDGE ON aux-edge @0;
SET lock={sessionid} WHEN (lock=0 OR lock={sessionid})
//Delete all edges. Ensure only that rank 0 is successfully deleted, and the other edges can be deleted through trim( ).
DELETE EDGE aux-edge @0,1, . . . N−1

6. Perform full garbage collection: trim( ).
All self-loop edges are no longer needed.
   6.a//For performance purposes, it is pre-checked once whether rank 0 exists to determine whether garbage collection can be performed on it.
   FETCH PROP ON aux-edge @0 Yield lock,property;
   6.b//Perform locking to prohibit other sessions.
   UPSERT EDGE aux-edge @0: (0,{sessionid});
   c//Delete edges corresponding to all possible rank values in a reverse order. The reverse order is to ensure that rank 0 is deleted last, and rank 0 cannot be concurrently operated before that.
   DELETE EDGE aux-edge @INT_MAX, . . . , 1,0
7. Perform incremental garbage collection: trim( ).
Only at least one self-loop edge is no longer needed. There is only a need to check the array length N in rank 0 and delete rank N+1, . . . , and rank INT_MAX.
8. When the vertex is deleted, the at least one self-loop edge needs to be deleted first, which is the same as the destruction through destory_array<int>0.

The foregoing operation flow is internal locking-operation-unlocking of a single function. If a plurality of functions in OGM are combined for batch submission, locking-operation 1-operation 2-unlocking may alternatively be combined to improve execution efficiency.

It can be learned that the following effects are achieved in this embodiment of the present application:
1. At an OGM level, complete array operations in data structures are implemented, such as construction, expansion, subscript accessing, and destruction. Array operations on the vertex property at a user level are converted into authorized self-loop operations at a graph database level, which are completed by OGM and invisible to the user.
2. The ACID semantics of each operation in the array is ensured, and integrity of data and operations when there are a plurality of concurrent clients is ensured.
3. There are a few capability requirements for graph databases. Only the CAS capability of a single command of the graph database is required, and the ACID capability of providing a plurality of combined statements is not required. Self-loop and access control are basic capabilities of all graph databases.
4. An operation on each element involves only a little of attached graph data, and performance is greatly improved such that performance of the graph database is not sacrificed.

Figure 7:
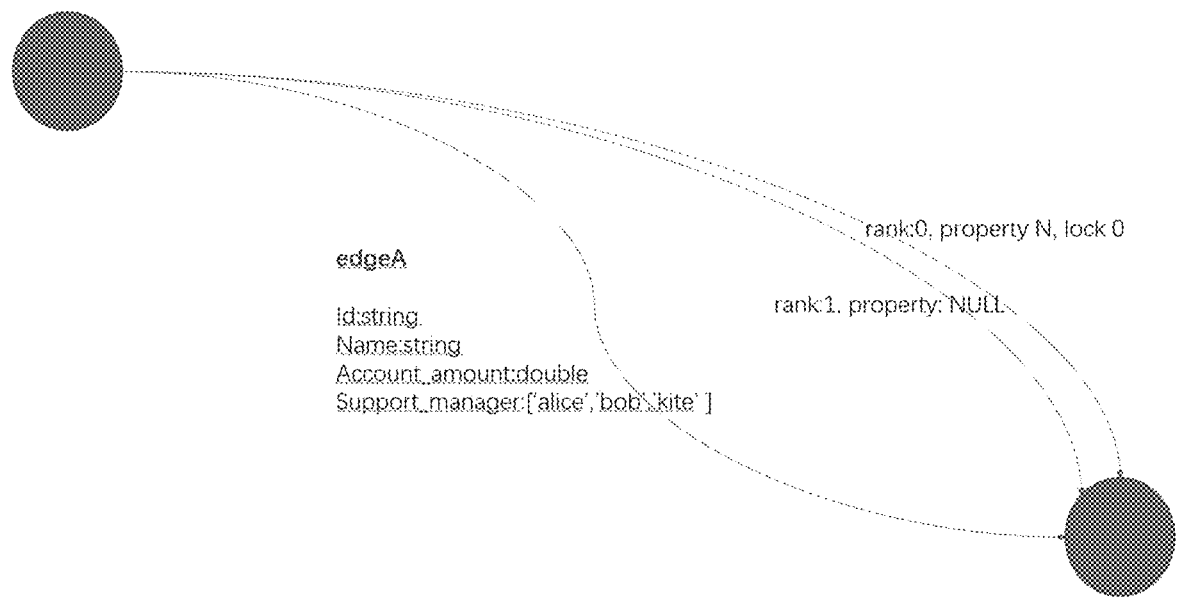
FIG. 7 is a diagram of an implementation in which an edge property supports an array according to an embodiment of the present application.

Specifically, in some embodiments of the present application, a vertex property in a graph database is enabled to support the composite data type array. A specific implementation process is described as follows on the basis of Embodiment 1:

As shown in FIG. 7, there is an edge edgeA between two vertices, where Id, Name, and Account_amount are properties of the edge and are of the string, string, and double types, respectively.

A property support_manager needs to be added, which is an array ['alice', 'bob', 'kite'].

The following is required:
1. Add an attached edge structure aux-edge for edgeA.
   For a vertex, the aux-edge is a self-loop.
   For an edge, the aux-edge is an attached edge with the same start and end vertices as edgeA.
   The aux-edge is visible to special users.
2. Construction, expansion, subscript accessing, destruction, garbage collection, and the like in the array are the same as those in Embodiment 1, and an operation on the edgeA array property is translated into an operation on each rank of aux-edge. Details are not described.
3. Delete attached edges before edgeA is deleted.

Figure 8:
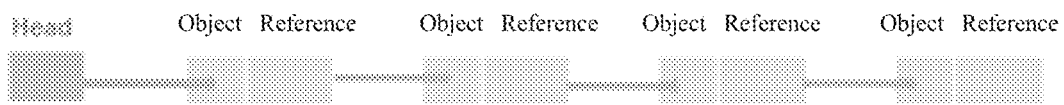
FIG. 8 is a schematic structural diagram of a singly linked list according to an embodiment of the present application.

Specifically, in some embodiments of the present application, a property in a graph database is enabled to support the composite data type linked list, a property of an attached edge further includes a rank value of the attached edge corresponding to a next element.
1. FIG. 8 shows a structure of a linked list (List). There is a head pointer (head in FIG. 8) in the linked list, which points to a first element.
2. A last element has no tail pointer (or points to NULL).
3. Each element has a pointer to a next element. Traverse this way.

Figure 9:
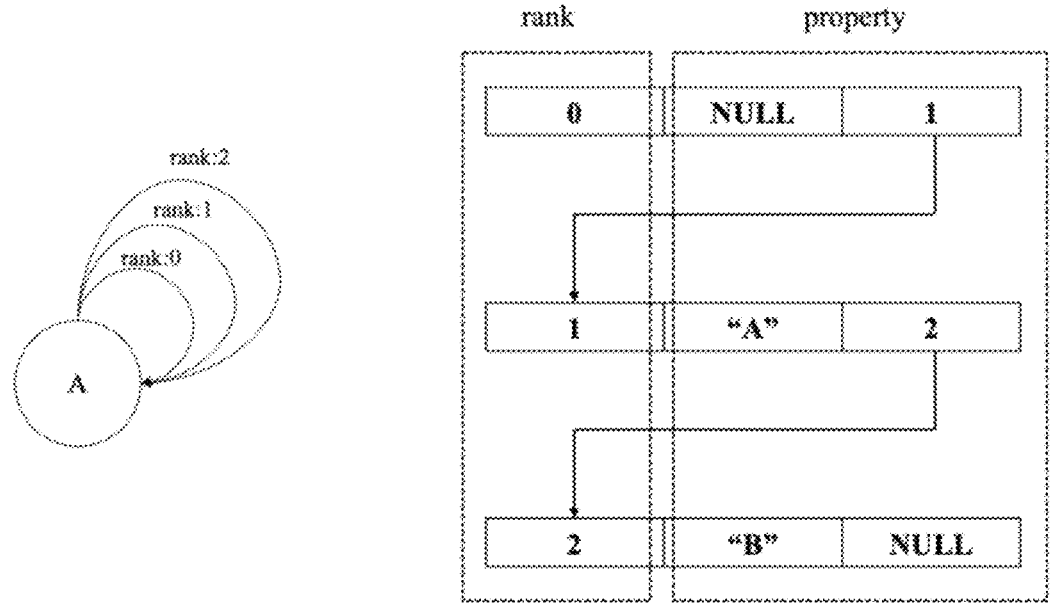
FIG. 9 is a schematic diagram of an implementation in which a property is a singly linked list according to an embodiment of the present application.

Referring to the idea in the previous section, when a property of a vertex is a linked list, a plurality of attached self-loop aux-edges are constructed to obtain a structure shown in FIG. 9.

rank 0: used for lock control. A first column of a property (property in FIG. 9) is used as a lock. A second column value (property=1 in FIG. 9) is a rank value of the first element in the linked list. In this way, an edge of rank 0 points to an edge of rank 1. Reading this 1 indicates that a corresponding rank value of the next element should be 1.
rank 1: the first element in the linked list. A first column "A" is a real value to be stored in the linked list. A second column is the rank value of the next element. That is, the next element continues to be pointed to.
rank 2: A first column "B" is the real value to be stored in the linked list. The second column is NULL, indicating a tail element of the linked list.

The following briefly describes how operations on the linked list escape to operations on aux-edge:
1. Insert an element, for example, change the linked list 1→2 to 1→100→2.
   a. Lock rank 0 (change NULL to session id).
   b. Write into an edge of rank 100 through UPSERT, and change the second column to 2 (in this case, 1→2, 100→2).
   c. Change the second column of rank 1 to 100 through UPSERT (in this case, 1→100, 100→2).
   d. Unlock rank 0.
2. Delete an element, for example, change 1→100→2 to 100→2.
   a. Lock rank 0.
   b. Write rank 0 through UPSERT, and change the second column to 2 (1→100→2, 0→100→2).
   c. Unlock rank 0.

In step b, although rank 1 also points to 100, the head pointer rank 0 also points to 100. Because no rank points to 1, it is orphaned and garbage collection can be performed on it through trim( ).

To delete the entire list, there is only a need to delete rank 0.
3. Perform traversal. A list is usually not addressed by subscript, but by pointer order.
   a. Lock rank 0.
   b. Obtain a corresponding rank value based on a second column value.
   c. Continue until a second column value corresponding to a rank is NULL.
   d. Unlock rank 0.

In comparison with get(i) of an array, a reason why the linked list needs to be locked is that the traversal process usually involves a plurality of RPC requests, and concurrency isolation between 2 RPC requests cannot be ensured without locking.

The method of full trim is the same as that in the previous section. The following briefly describes the method of incremental trim.

a. Perform locking and create a bitmap in the memory of OGM, from 0 to INT_MAX, all set to 0.
b. As in the traversal step, obtain all rank values of the linked list, and if they exist, set the bitmap to 1.
c. If a corresponding value of a subscript i in the bitmap is still 0, the edge corresponding to the rank value deleted.
d. Perform unlocking.

An additional field can be added to rank 0 to cache a length of the entire linked list. The value is changed each time an element is added or deleted. In this way, the length of the linked list can be quickly obtained.

Specifically, in some of the embodiments of the present application, a property in a graph database is enabled to support the composite data type set. In this embodiment, when composite data is of the set type, on the basis of Embodiment 1, the rank value of the attached edge is a hash value of the real value of the corresponding element, and the property of the attached edge further includes the rank value of the attached edge corresponding to the next element.

In this embodiment, a HashSet is used as an example for description.

Features of the Hashset are as follows:
1. There are no duplicate elements in the set. A same element can be inserted a plurality of times without changing elements of the set.
2. When an element is read, whether the element exists is returned.
3. All elements can be traversed one by one, and there is no need to traverse the elements in a specific order.

Figure 10:
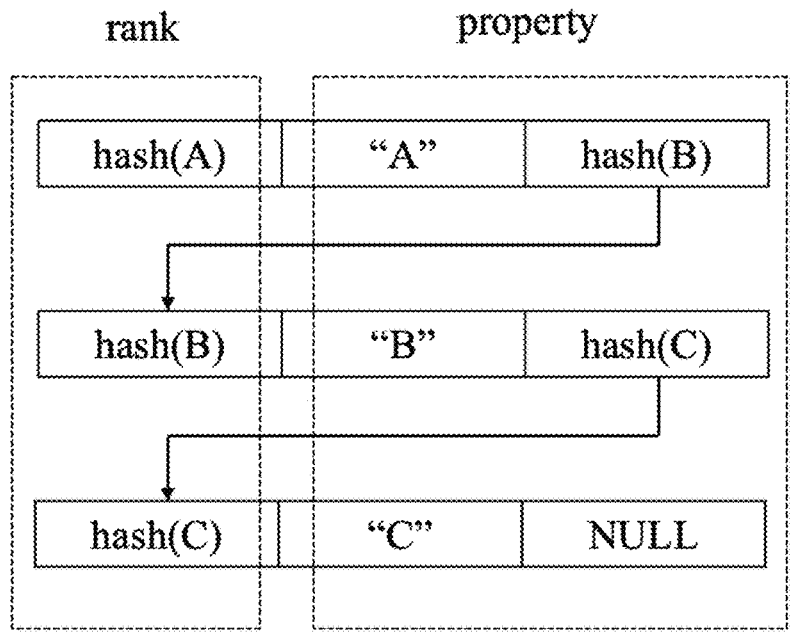
FIG. 10 is a schematic diagram of an implementation in which a property is a set according to an embodiment of the present application.

As shown in FIG. 10, the HashSet is constructed as a special type of linked list.

rank 0: used for lock control. A first column of a property is used as a lock, and a second column value is a rank value of the first element in the linked list such that the edge of rank 0 points to a first element to be inserted into the HashSet.

hash(A): a hash value of "A", and the first element in the linked list in the example. The first column "A" is a real value to be stored in the linked list, and a second column is the rank value of the next element, namely, hash(B).

hash(B): a hash value of "B", and the first element in the linked list in the example. A first column "B" is a real value to be stored in the linked list, and a second column is the rank value of the next element, namely, hash(C).

rank(C): A first column "C" is the real value to be stored in the linked list. The second column is NULL, indicating a tail element of the linked list.

Main steps to read an element (X) are follows:
1. Compute a value of hash(X).
2. Check whether an edge with a rank of hash(X) exists.

Main steps to insert the element (X) are follows:
1. Compute hash(X).
2. Check whether an edge with a rank of hash(X) exists. If yes, directly return the edge.
3. Insert hash(X) after 0, change a next element of 0 to a next element of hash(X), which means that a new element is inserted at the head of the linked list each time.

Steps of traversal are as follows:
Because the HashSet is implemented as a linked list, the traversal process is the same as that for the linked list in Embodiment 3.

Specifically, in some of the embodiments of the present application, a property in a graph database is enabled to support the composite data type HashMap. Because an implementation principle of HashMap<key,value> is very close to that of the HashSet, there is only a need to implement the key as hash(key), and add an additional field to record the value.

It should be noted that steps shown in the foregoing process or the flowchart in the accompanying drawings may be executed in a computer system such as a set of computer executable instructions. In addition, although a logic sequence is shown in the flowchart, the shown or described steps may be executed in a sequence different from that described herein.

Embodiment 3

This embodiment further provides a system for separating a graph structure and a graph property. The system is used to implement the foregoing embodiments and preferred implementations, which have been described and are not described again. As used below, the terms "module", "unit", and "subunit" and the like may implement the combination of software and/or hardware having predetermined functions. Although the apparatus described in the following embodiment is preferably implemented by software, implementation by hardware or the combination of the software and the hardware is also possible and may be conceived.

Figure 11:
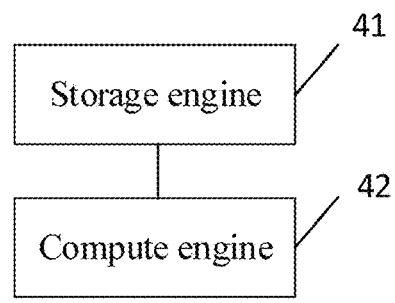
FIG. 11 is a structural block diagram of a system for separating a graph structure and a graph property according to an embodiment of the present application.

FIG. 11 is a structural block diagram of a system for separating a graph structure and a graph property according to an embodiment of the present application. As shown in FIG. 11, the system includes a storage engine 41 and a compute engine 42.

The storage engine 41 separates a key-value structure and separately stores a graph structure and a graph property of graph data. The compute engine 42 reads the graph structure, caches the graph structure for a short term in a single query request scenario, and caches the graph structure for a long term in a read-only analysis scenario. In the storage engine 41 in this embodiment, the key-value separation solution is used to separate the graph structure and the graph property in hardware. This improves a speed of reading the graph structure in a hard disk and memory, accelerates access to the graph structure, and is of great help to subsequent computing. In addition, a development amount and development risk are reduced, and historical compatibility of data files is maintained. The compute engine 42 caches the graph structure for the long term and short term. This further reduces a latency of a graph query and graph computing, and compatibility of historical queries is maintained. The combination of the two solutions resolves problems that engineering is complex and deep graph traversal performance is poor when graph data is processed, reduces engineering complexity, and improves the deep graph traversal performance.

It should be noted that for the specific example in this embodiment, reference may be made to the example described in the embodiments and optional implementations described above. Details are not described herein again.

It should be noted that each of the foregoing modules may be a functional module or a program module, and may be implemented by software or hardware. For modules implemented by hardware, the modules may be located in a same processor; or the modules, in any combination, may be located in different processors.

Embodiment 4

This embodiment further provides an electronic device, including a memory and a processor. The memory stores a computer program, and the processor is configured to perform the steps in any of the method embodiments above by running the computer program.

Optionally, the electronic device may further include a transmission apparatus and an input/output apparatus, where the transmission apparatus is connected to the processor described above, and the input/output apparatus is connected to the processor described above.

In addition, an embodiment of the present application may provide a storage medium with reference to the method for storing data in a graph database in the foregoing embodiments. The storage medium stores a computer program. When the computer program is executed by a processor, any method for method for storing data in a graph database in the foregoing embodiments is implemented.

In an embodiment, a computer device is provided. The computer device may be a terminal. The computer device includes a processor, a memory, a network interface, a display, and an input apparatus that are connected through a system bus. The processor of the computer device is configured to provide computing and control capabilities. The memory of the computer device includes a nonvolatile storage medium and an internal memory. The nonvolatile storage medium stores an operating system and a computer program. The internal memory provides an environment for operations of the operating system and the computer program in the nonvolatile storage medium. The network interface of the computer device is configured to communicate with an external terminal through a network. When the computer program is executed by the processor, a method for storing data in a graph database is implemented. The display of the computer device may be a liquid crystal display (LCD) or an e-ink display; the input apparatus of the computer device may be a touch layer covering the display, or a key, a trackball or a touchpad set on the housing of the computer device, or an external keyboard, a touchpad or a mouse, or the like.

Figure 12:
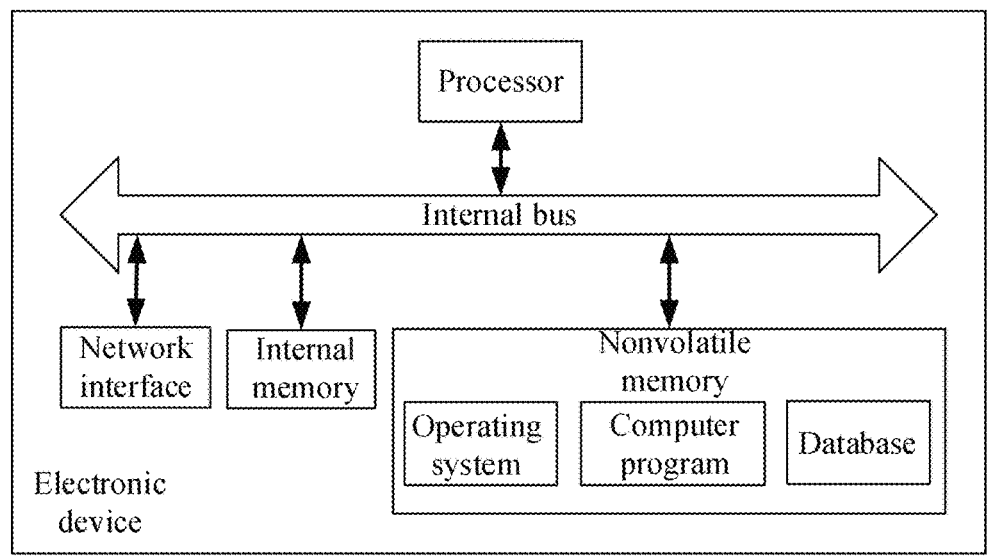
FIG. 12 is a schematic diagram of an internal structure of an electronic device according to an embodiment of the present application.

In an embodiment, FIG. 12 is a schematic diagram of an internal structure of an electronic device according to an embodiment of the present application. As shown in FIG. 12, an electronic device is provided. The electronic device may be a server, and an internal structure thereof may be as shown in FIG. 12. The electronic device includes a processor, a network interface, an internal memory, and a nonvolatile memory that are connected through an internal bus, where the nonvolatile memory stores an operating system, a computer program, and a database. The processor is configured to provide a computing and control capability. The network interface is configured to provide communication with an external terminal through a network connection. The internal memory is configured to provide an environment for running of an operating system and a computer program. When being executed by a processor, the computer program implements the method for storing data in a graph database. The database is configured to store data.

Those skilled in the art may understand that the structure shown in FIG. 12 is only a block diagram of a part of the structure related to the solution of the present application and does not constitute a limitation on an electronic device to which the solution of the present application is applied. Specifically, the electronic device may include more or fewer components than those shown in the figures, or some components may be combined, or different component arrangements may be used.

Those of ordinary skill in the art may understand that all or some of the procedures in the methods of the foregoing embodiments may be implemented by a computer program instructing related hardware. The computer program may be stored in a nonvolatile computer readable storage medium. When the computer program is executed, the procedures in the embodiments of the foregoing methods may be performed. Any reference used for a memory, a storage, a database, or other mediums used in various embodiments provided in the present application may include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

Those skilled in the art should understand that the technical features of the foregoing embodiments can be arbitrarily combined. In an effort to provide a concise description, not all possible combinations of all the technical features of the embodiments are described. However, these combinations of technical features should be construed as disclosed in the description as long as no contradiction occurs.

The foregoing embodiments are merely illustrative of several implementations of the present application, and the description thereof is more specific and detailed, but is not to be construed as a limitation to the patentable scope of the present disclosure. It should be pointed out that several variations and improvements may be made by those of ordinary skill in the art without departing from the conception of the present application, but such variations and improvements should fall within the protection scope of the present application. Therefore, the protection scope of the present application should be subject to the protection scope defined by the claims.

What is claimed is:

1. A method for storing data in a graph database in a system comprising a storage engine and a compute engine, the method comprising:
    separating a key-value structure of the storage engine and separately storing a graph structure and a graph property of graph data;
    reading, by the compute engine, the graph structure, caching the graph structure for a short term in a single query request scenario, and caching the graph structure for a long term in a read-only analysis scenario;
    the method further comprising:
    when a first property of a first graph element of the graph database is composite data, creating N+1 self-loop attached edges on the first graph element, wherein N is greater than a quantity of elements of the composite data, and the first graph element is the graph property;
    matching each attached edge on the first graph element with the elements of the composite data one-to-one, wherein a rank value of the attached edge is a ranking value of the corresponding element in the composite data, and a property of the attached edge comprises a real value of the corresponding element;

wherein the attached edges comprise a first edge, and a property of the first edge comprises a concurrency control value, when a client wants to operate the attached edge on the first graph element, determining whether the concurrency control value is a controllable value, and if yes, allowing the client to operate the attached edge, and changing the controllable value to a unique identifier of the client, or if no, forbidding the client to operate the attached edge; and wherein the property of the first edge further comprises a composite length, the composite length is the quantity of elements of the composite data, and when the first graph element needs to be expanded to a length of M and the concurrency control value is changed to the unique identifier of the client, sequentially creating $(N+2)^{th}$ to $M^{th}$ attached edges, and changing the composite length to M, wherein M is greater than N.

2. The method according to claim 1, wherein the separating a key-value structure of the storage engine comprises:
adding four paired read interfaces in the storage engine to obtain data stored in a key part of the key-value structure.

3. The method according to claim 1, wherein the caching the graph structure for a short term comprises:
determining a required part of the graph structure through an execution plan from a first clause of a query statement, and checking whether the required part of the graph structure is cached in an adjacency list of a current process;
if no, requesting and obtaining an edge from the storage engine, and adding a corresponding linked list to the adjacency list; or if yes, obtaining the required part of the graph structure from the adjacency list; and
executing the query statement and releasing cached data of the adjacency list.

4. The method according to claim 3, wherein the requesting and obtaining an edge from the storage engine comprises:
actively making, by the compute engine, a remote procedure call (RPC) request to the storage engine, or returning the edge through pre-read loading of the storage engine.

5. The method according to claim 1, wherein the caching the graph structure for a long term comprises:
caching the graph structure through a compressed sparse row (CSR).

6. The method according to claim 5, wherein the caching the graph structure through a CSR comprises:
collecting statistics on and aggregating data of each partition of the graph structure in the storage engine, performing vertex encoding and edge encoding on the data, and storing the data in the storage engine; and
scanning all mapping relationships and all edges in the key-value part of each partition, processing a corresponding concurrent task and subtask, generating the CSR, and caching the CSR in the compute engine.

7. The method according to claim 6, after the generating the CSR and caching the CSR in the compute engine, comprising:
deleting a graph topology cached in the compute engine and a persistent mapping encoded in the storage engine through a delete instruction.

8. The method according to claim 1, wherein a visibility permission on the attached edge is set.

9. The method according to claim 1, wherein when the client wants to operate the attached edge on the first graph element, the attached edge to be operated and the first edge are concurrently read.

10. The method according to claim 1, further comprising:
determining in real time whether the unique identifier of the client exists and whether the client is online, and if one of the conditions is not met, changing the concurrency control value from the unique identifier of the client to the controllable value.

11. The method according to claim 1, wherein first creation and subsequent expansion each are a creation event, and the method further comprises:
before each creation event is completed, displaying and operating only data before the current creation event; and
if at least one attached edge fails to be created in a creation event and a retry fails, performing garbage collection on an attached edge successfully created in the creation event.

12. The method according to claim 1, wherein when the composite data is of a linked list type, the property of the attached edge further comprises a rank value of an attached edge corresponding to a next element.

13. The method according to claim 1, wherein when the composite data is of a set type, the rank value of the attached edge is a hash value of a real value of a corresponding element, and the property of the attached edge further comprises a rank value of an attached edge corresponding to a next element.

* * * * *